United States Patent [19]

Wright et al.

[11] Patent Number: 6,084,542
[45] Date of Patent: Jul. 4, 2000

[54] GLOBAL POSITIONING SYSTEM RECORDER

[75] Inventors: Fred P. Wright, Aiken, S.C.; David P. Barringer, Milford, Ohio

[73] Assignee: Alternative Security Solutions, Inc., Tallahassee, Fla.

[21] Appl. No.: 08/964,538

[22] Filed: Nov. 5, 1997

(Under 37 CFR 1.47)

Related U.S. Application Data

[60] Provisional application No. 60/030,038, Nov. 5, 1996.

[51] Int. Cl.[7] .................. G01S 5/02; H04B 7/185
[52] U.S. Cl. .................. 342/357.13; 342/357.06; 701/213; 701/208
[58] Field of Search .................. 342/357.06, 357.13; 701/208, 209, 210, 211, 213

[56] References Cited

U.S. PATENT DOCUMENTS

| | | | |
|---|---|---|---|
| 5,170,164 | 12/1992 | Lewis | 340/988 |
| 5,412,573 | 5/1995 | Barnea et al. | 364/449 |
| 5,612,875 | 3/1997 | Haendel et al. | 364/424.04 |
| 5,835,881 | 11/1998 | Trovato et al. | 701/211 |
| 5,852,790 | 12/1998 | Hayes et al. | 701/213 |
| 5,887,269 | 3/1999 | Brunts et al. | 701/208 |

*Primary Examiner*—Thomas H. Tarcza
*Assistant Examiner*—Dao L. Phan
*Attorney, Agent, or Firm*—Robert C. Kain, Jr.

[57] ABSTRACT

A global positioning system recorder (GPSR), comprising a housing that contains a GPS receiver and associated circuitry, an antenna external to the housing and operatively connected to the receiver, a memory card slot, and control circuitry inside the housing for interfacing the GPS receiver with the memory slot. In operation, a memory element such as a PCMCIA card containing a set of operational parameters for the GPSR is inserted into the memory slot. The receiver reads the operational data from the memory card, receives GPS signals via the antenna, processes the signals to determine the position of the recorder, and writes the position data (along with the date and time) to the memory element. In a preferred embodiment, a new position data point is recorded only if the GPSR has moved since the last position data point was recorded, and/or if a parameter of interest has changed by at least a preselected amount. The GPSR may also be connected to one or more sensors that measure various environmental parameters of interest. Data from these sensors is processed, integrated with the corresponding time/position data, and stored on the memory card for later analysis.

19 Claims, 3 Drawing Sheets

GLOBAL POSITIONING SYSTEM RECORDER

This application claims the benefit of U.S. Provisional Application No. 60/030,038 filed Nov. 05, 1996.

BACKGROUND OF THE INVENTION

1. Field of the Invention

The present invention relates generally to apparatus and methods for recording and analyzing the route traveled by a movable object. In particular, the present invention relates to an apparatus for use with a global positioning system, to methods for programming and using the apparatus, and to methods for recording and analyzing data obtained with the apparatus.

2. Discussion of Background:

Satellite-based global positioning systems were originally developed by the United States and the former Soviet Union as navigation aids for land vehicles, aircraft and ships at sea. At first, use of the systems—the United States Transit System and Global Positioning System (GPS) and the GLONASS system developed by the former Soviet Union—was largely confined to the military. Recently, however, decreases in the size and cost of GPS receivers have led to their increased use in civilian applications. (As used herein, the term "GPS" refers to a system of navigation satellites such as the GPS and GLONASS systems, both of which are now available for use by the general public of all nations.)

The United States GPS system has three segments: a space segment, a control segment, and a user segment. The space segment consists of twenty-five satellites in six low-earth orbits. The satellites constantly transmit signals with highly accurate orbital and timing information, including each satellite's range from the center of the earth. The control segment includes a master control station, several remote monitoring stations, and assorted uplink/downlink antennas. The monitoring stations track the satellites and feed the data to the control station, which updates the orbital information for each satellite and immediately transmits the updated data to the satellites.

The user segment includes a GPS receiver that receives the satellite signals and uses these signals to the calculate latitude, longitude, and altitude of the receiver by triangulation. The speed of the receiver is calculated by taking successive data points and computing the change in distance per unit time interval; the course is computed from the inverse tangent of the change in latitude divided by the change in longitude. Thus, a GPS receiver can determine its own three-dimensional position on the Earth's surface with a high degree of accuracy. When recorded and/or transmitted with the date and time for each position reading, this data can be used to plot the movements of an object (person; land, sea, or air vehicle; or indeed any movable object) with a high degree of accuracy. A GPS receiver with an on-board recorder can be viewed as analogous to the "black box" flight data recorders installed on airliners world-wide: like these instruments, it is capable of providing position, date, time, course, and speed data at regular intervals.

For military receivers, the GPS satellite system provides positional accuracy to within approximately 6 meters ("military accuracy"). For civilian receivers, there is a deliberately-induced error factor ("selective availability") that reduces the accuracy to ±100 meters, 95% of the time ("civilian accuracy"). Some civilian receivers are capable of accuracies on the order of ±30 meters, but significantly less than 95% of the time.

At present, civilian applications of GPS include personal navigation, commercial navigation, surveying, asset tracking, and many others. Some GPS receivers utilize a methodology known as Differential GPS (DGPS) to increase accuracy; some are capable of receiving both GPS and GLONASS signals.

GPS apparatus (that is, apparatus that includes a GPS receiver, a recorder, and associated circuitry) is widely available from several different manufacturers. However, much of this apparatus is expensive to manufacture, complex and difficult to use, and requires the services of a skilled technician to set the operational parameters of the instrument.

Furthermore, such apparatus only provides information relating to the position, time, course, and speed of objects. Such information is useful for applications such as navigation and asset tracking (of vehicles and other movable objects). For other applications, however, the positional data provided by a GPS apparatus must be correlated with data relating to other parameters of interest (presence and/or weight of cargo, the state wherein a moving vehicle is located, etc.). The availability of a self-contained apparatus that could record such additional data in conjunction with positional data would make GPS technology a useful management tool for a wide range of applications. However, no such apparatus is known.

There is a need for a compact, cost-effective, user-friendly apparatus with the capability for measuring environmental parameters of interest and integrating these measurements with the positional data provided by a GPS receiver.

SUMMARY OF THE INVENTION

According to its major aspects and broadly stated, the present invention is a global positioning system recorder (GPSR), comprising a housing that contains a GPS receiver and associated circuitry, an antenna external to the housing and operatively connected to the receiver, a memory card slot, and control circuitry inside the housing for interfacing the GPS receiver with the memory slot. In operation, a memory element such as a PCMCIA card (encoded with the operational parameters for the GPSR) is inserted into the memory slot. The receiver reads the operational data from the memory card, receives GPS signals via the antenna, processes the signals to determine the position, course, and speed of the receiver, and writes this data (along with the date and time) to the memory card. The GPSR may also be connected to one or more sensors that measure various environmental parameters of interest. If desired, data from these sensors may be processed, integrated with the corresponding positional data, and stored on the memory card for later analysis. The GPSR is simple and straightforward to use, requires no specialized training for the end user, and provides the capability for converting recorded data into useful information.

The GPSR with associated memory element is an important feature of the present invention. The memory element, preferably a PCMCIA card (Personal Computer Memory Card, International Association Standard), contains prerecorded operational parameters for the system. Thus, the GPSR is set up for use simply by inserting the card into the slot. Operational parameters are changed by removing one memory card from the slot and inserting another card containing a different set of parameters; data is retrieved simply by removing the memory card and transferring it to a suitably programmed computer or work station where the data is downloaded and analyzed. Thus, a GPSR according to the present invention does not need to be connected to a computer or work station to change its operational parameters or retrieve recorded data for analysis elsewhere. If desired, a GPSR according to the invention may be equipped with a PCMCIA hard drive to provide additional memory. Alternatively, the GPSR may have a plurality of memory slots for receiving PCMCIA memory cards (for example, two such slots), together with controls that allow the user to record data on a selected memory card. As will be evident, additional memory allows for extended data-recording periods and/or recording greater amounts of data.

Another important feature of the present invention is the capability for measuring a variety of parameters of interest and recording those measurements in a plurality of separate and assignable data tracks, in conjunction with the GPS positional data. (As used herein, the term "positional data" refers to data computed from the GPS signals, including position, course, and speed). This feature allows the user to measure and record changes in temperature, barometric pressure, ambient concentrations of various substances, the occurrence or nonoccurrence of an event, the presence or absence of an object, and so forth, correlate these data with GPS positional data, and map the resulting data with a high degree of accuracy. By way of example, a GPSR according to the invention can record changes in a parameter via a sensor that triggers at pre-selected limits, such as a rain gauge that trips a switch every time a quarter inch of rain falls. Alternatively, the GPSR can be used to map the observed locations of items of interest, such as certain species of trees or wildlife.

Another feature of the present invention is the method for recording the position of an object (vehicle, person, or any object whose position is to be to tracked). The method includes the steps of recording a set of operational parameters on a memory card, inserting the card into the GPSR memory slot, and turning on the GPSR to initiate the recording sequence. The GPSR automatically reads the operational parameters (including the recording interval) from the memory card; the GPS circuitry automatically determines the position of the object via the signals emitted from the GPS satellites and received by the antenna. The position, date, and time are written to the memory card for later retrieval and data analysis; course and speed may also be computed and written to the memory card if desired. This data can readily be converted to ASCII format for use with third-party software (spreadsheets, statistical analysis programs, accounting programs, mapping programs, and so forth).

Still another feature of the present invention is the method of operation of the GPSR, which offers the user a number of options for customizing the data-gathering and recording process to meet individual needs. For example, the GPSR can be programmed to select only the desired GPS data for recording and filter out unwanted data from the GPS signals. The GPSR can be programmed to record data at time and/or distance intervals selected by the user, or (if recording data from external sensors) to record data only if some parameter of interest has changed by some minimum, user-selected amount. In order to minimize recording unneeded data and conserve space on the memory card, the GPSR can be programmed to record a data point only if the instrument itself has moved since the previous data point was recorded. Under PCMCIA parameter control, the user has the option of stopping recording when the capacity of the memory card is exceeded, of overwriting the oldest recorded data point with the new point, or switching to another memory card for further recording.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
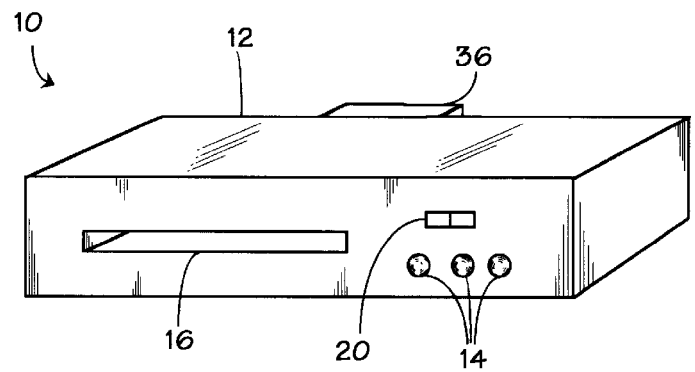
FIG. 1 is a perspective view of a GPSR apparatus according to a preferred embodiment of the present invention.

In the following description, reference numerals are used to identify structural elements, portions of elements, or surfaces in the drawings, as such elements, portions or surfaces may be further described or explained by the entire written specification. For consistency, whenever the same numeral is used in different drawings, it indicates the same element, portion, surface and area as when first used. As used herein, the terms "horizontal," "vertical," "left," "right," "up," "down," as well as adjectival and adverbial derivatives thereof, refer to the relative orientation of the illustrated structure as the particular drawing figure faces the reader.

Referring now to FIG. 1, there is shown a global positioning system recorder (GPSR) according to a preferred embodiment of the present invention. A GPSR 10 includes a housing 12 with indicator lights or LEDs 14, and at least one memory element slot 16 (additional memory slots, for accommodating additional memory cards, may be provided if desired). Memory slot 16 is preferably a PCMCIA slot such as is known in the art.

Figure 2:
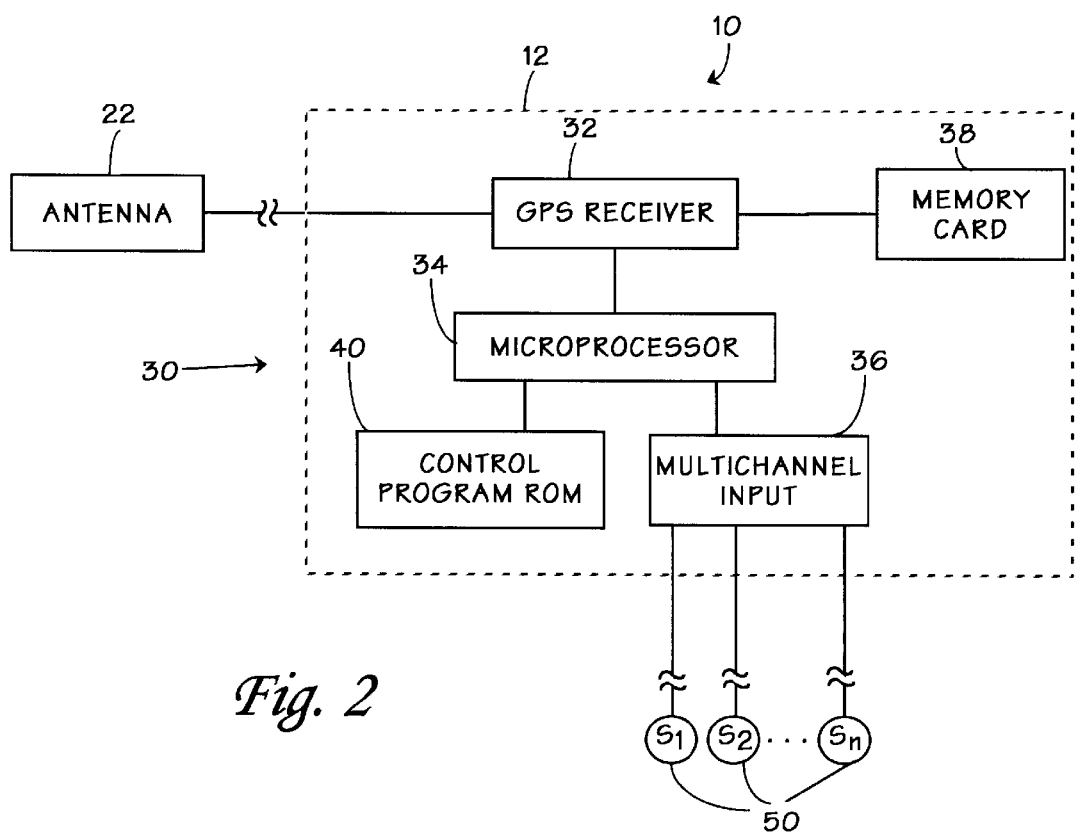
FIG. 2 is a simplified block diagram of a GPSR circuit according to a preferred embodiment of the present invention.

Housing 12 is preferably a small, seamless case with front and rear plates (only a front plate 18 is shown). GPSR 10 may be mounted under the dashboard of a vehicle, under a seat, or on the floor. Alternatively, GPSR 10 may be carried by the user, or attached to any movable object whose position is to be tracked (shipping carton, package, etc.). In a preferred embodiment of the invention, the contents of housing 12 are substantially tamperproof; however, a device 20 such as a keyed lock, tamper-resistant switch, or combination lock may be provided to restrict access to the interior of housing 12 if desired. Such a device might also prevent unauthorized and/or accidental removal of the PCMCIA card from slot 16. In use, GPSR 10 is connected to an external antenna 22 (FIG. 2) or an antenna mounted directly to housing 12 (not shown).

Housing 12 contains a circuit 30, including a GPS receiver 32 such as can be purchased off-the-shelf from Rockwell, Magellan, Motorola, Trimble, or other manufacturers of such receivers. Receiver 32 is a type of GPS receiver that is operable with antenna 22 (preferably, a passive antenna) and permits tracking a plurality of GPS satellites, preferably as many as twelve satellites.

Circuit 30 also includes a programmable microprocessor element 34 and a multi-channel input 36. Microprocessor 34 preferably includes a microprocessor, permanent program storage (such, as ROM 40) and scratchpad memory (RAM) on a single integrated circuit (IC) for ease of assembly (however, other arrangements may also be useful). Microprocessor 34 is programmable by a skilled technician in a manner to be described below.

The various components of GPSR 10 are selected with a view to facilitate easy assembly, testing, and troubleshooting. Thus, GPSR 10 preferably includes a single printed circuit board having all major internal components (circuit 30, LEDs 14, and so forth) mounted on the same surface. Housing 12 may have a plurality of windows to accommodate a plurality of LEDs 14; alternatively, a single window in the housing may readily be dimensioned for showing all of LEDs 14.

In operation, microprocessor 34 executes instructions stored in permanent storage (i.e., the operating program). The program directs microprocessor 34 to read the operating parameters for GPSR 10, such as the recording interval, from a PCMCIA card (card 38) installed in slot 16. The scratchpad memory (RAM) keeps track of parameters while apparatus 10 is operating (such as the last position stored, for use in distance calculations).

Circuit 30 also includes connections (not shown) to lights 14, memory slot 16, and an internal or external power source (these connections are of a type familiar to those skilled in the art). Circuit 30 may also include diagnostic functions for assuring that GPSR 10 is operating properly. It will be understood by those of ordinary skill in the art that the specific components and layout of circuit 30 may vary widely without departing from the spirit of the present invention. Furthermore, while the following description describes the use of a PCMCIA card for data recording with GPSR 10, other types of portable storage devices (magnetic tape, removable hard drives, ZIP and JAZ disks, etc.) may also be useful.

U.S. Pat. No. 5,852,790 filed Apr. 22, 1996 ("Global Positioning System Recorder and Method"), the disclosure of which is incorporated herein by reference, prior art GPS recording devices have required set-up by a skilled technician prior to use. Set-up has required the use of a built-in keypad or a personal computer-sized terminal to which the GPS recording device is physically connected. The present invention, like the apparatus described in the above-referenced patent application, eliminates the need both for attachment to a computer terminal and for a skilled technician through the use of a transferable read/write memory element such as a memory card used with a PCMCIA slot.

Set-up and operational parameters for GPSR 10 are recorded on a suitable memory card, which is simply installed in slot 16. Upon start-up, GPSR 10 reads these parameters off the card and initializes itself automatically. Preferably, GPSR 10 uses SRAM (Static Random Access Memory). Unlike flash memory, which requires data to be erased in large blocks and can only be written to approximately 10,000 times before its performance begins to degrade, SRAM can be written and overwritten billions of times.

When GPSR 10 is in use, lights or LEDs 14 indicate that the power is on, that GPSR 10 is functioning properly and that a properly formatted PCMCIA memory card (or other suitable storage device) is installed in slot 16. Lights 14 may also indicate whether or not the card is full, and if the battery in the card (needed for data retention) is low or dead.

GPSR 10 receives data from the orbiting GPS satellites via antenna 22. As is well known in the art, GPS data consists of a large number of different data items from a plurality of satellites (typically, data from at least three satellites is needed to compute reliable positional data). The data is processed by circuit 30 to filter out undesired data, for example, by the methods described in the above-referenced application. Only the desired data are retained and recorded. That is, the program stored in microprocessor 34 may be designed to filter out unwanted GPS data from the GPS data string received and processed by circuit 30, and retain and write only the desired GPS data to the memory card. The typical user of GPSR 10 needs only the date, time, and position (latitude, longitude, latitude); other, extraneous data can safely be discarded. A single data file containing only the retained GPS information is substantially shorter in length then the full GPS data string. Thus, filtering the data received from the GPS satellites in order to write smaller files to memory card 38 allows recording more useful data onto the card.

In a preferred embodiment of the present invention, GPS receiver 32 outputs a 256-byte data message over a serial link to microprocessor 34 approximately once per second (while the format and content of the message may vary from manufacturer to manufacturer, typical GPS receivers operate in much the same way). This message contains a wide range of data which describe what receiver 32 is decoding from the signals received by antenna 22.

Not all the bytes from the GPS receiver are stored on card 38 (stored data may include no more than 16 of the bytes from the GPS receiver message). Data which is generally filtered out includes space vehicle identification numbers being used to compute the position, signal strengths, compute azimuth and elevations of the visible satellites, and so forth. If GPSR 10 is directed to store data every 10 seconds, 9 out of 10 readings are discarded; if data is to be stored every 60 seconds, 59 of 60 readings are discarded. Position updates which show no movement from the previous position may also be filtered out under PCMCIA parameter control.

The GPS satellites transmit data continuously; apparatus 10 continually receives, decodes, and interprets this data from multiple satellites and computes and outputs a new, updated time and position fix once per second (or at some other selected interval). This data is filtered and compressed, then written to card 38 in the order received. This process continues until card 38 is filled, GPSR 10 is shut down, and/or card 38 is removed from slot 16. The number of data points (i.e., the number of position readings, also termed "positional data points") that can be stored on card 38 depends on the degree of filtering/compressing that is done by circuit 30 and the storage capacity of the card. Under PCMCIA parameter control, the user has the option of stopping recording when the capacity of card 38 is exceeded, or of overwriting the oldest data point with the new point.

As noted above, input terminal 36 in a preferred embodiment of the invention is capable of receiving input data from one or more sensors 50. Sensors 50 may be any suitable type of sensor for measuring temperature, barometric pressure, humidity, the ambient concentration of various substances, or other parameters of interest. Alternatively, sensors 50 may be digital sensors such as contact closures. If desired, microprocessor 34 may be programmed to store positional data only when a parameter measured by a sensor 50 reaches or exceeds a pre-selected threshold. This data is processed by microprocessor 34, correlated with the positional data, and written to card 38 in conjunction with the corresponding positional data. For example, GPSR 10 could correlate positional data with the presence or absence of cargo (or indeed, the weight of the cargo) carried by a vehicle.

Figure 3:
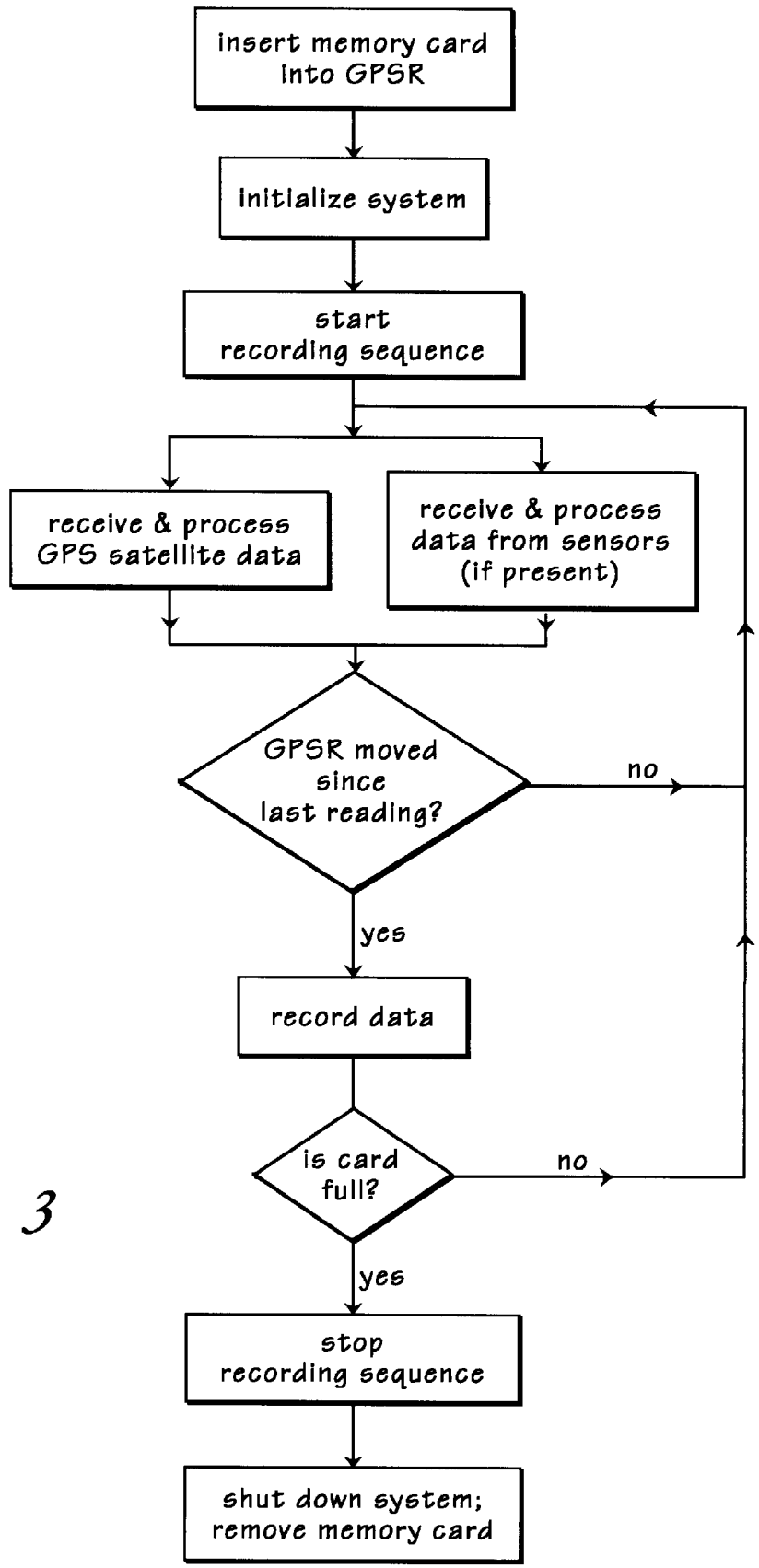
FIG. 3 is a flow chart illustrating a method for recording data with the GPSR apparatus of FIG. 1 according to a preferred embodiment of the present invention.
Figure 4:
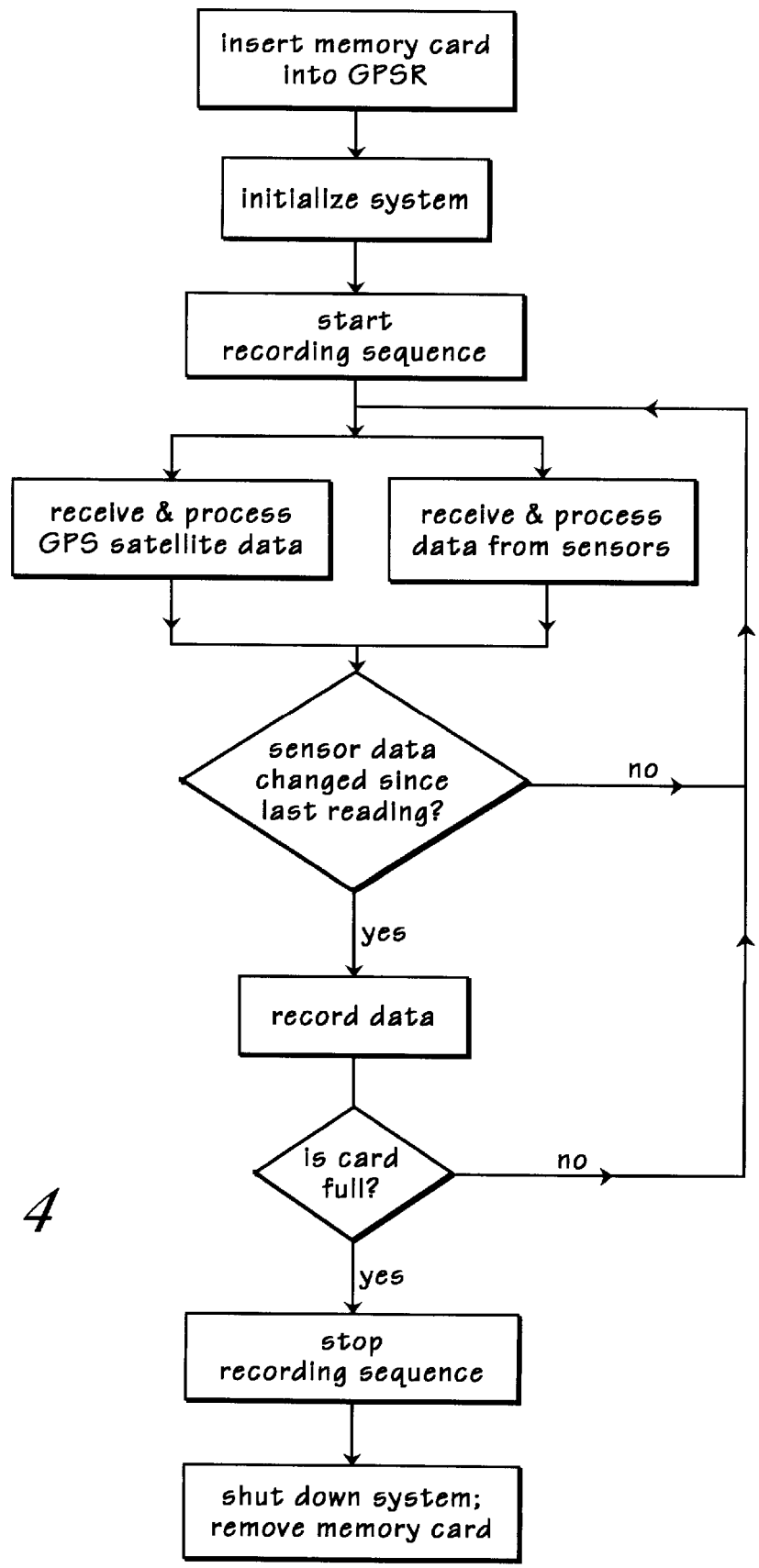
FIG. 4 is a flow chart illustrating another method for recording data with the GPSR apparatus of FIG. 1.

FIGS. 3 and 4 illustrate generally the operation of GPSR 10 in the field.

1. A technician places memory card 38 (such as a PCM-CIA card) in a suitable computer having read/write capability. The computer is programmed to carry out the needed operations on card 38 via menu-driven software or other suitable technique. The technician activates the computer to erase old GPS data files on card 38 (if present).

2. The technician selects the desired recording rate for GPSR 10. Recording rates typically range from once per second to once per 255 seconds; however, longer rates (as well as a "0" second rate whereby data is not recorded to card 38 except when one of sensors 50 is triggered or exceeds a selected threshold) are possible. The selected recording rate is written in computer readable form onto card 38. The technician also selects whether all data points are to be recorded on card 38, whether data is to be recorded only when GPSR 10 is moving, and/or whether data is to be recorded only when the values measured by a sensor 50 (or sensors 50) have changed outside a pre-selected window or threshold. Finally, the technician selects whether to write over the oldest stored data when card 38 is full, to stop recording, or prompt the end user to install a new memory card.

3. The technician removes card 38 from the computer and transfers it to the person who will be using GPSR 10 in the field.

4. The user takes card 38 to an object that has been previously fitted with a GPSR 10. A GPSR according to the present invention may be installed on or in any movable object, including but not limited to shipping cartons, boxcars, and land, sea, and air vehicles; it may also be carried by the user. The GPSR may be battery powered, solar powered, connected to the battery of a motor vehicle, or connected to some other suitable source of power for operating circuit 30.

5. The user inserts card 38 into slot 16. In a preferred embodiment of the invention, circuit 30 includes circuitry for turning GPSR 10 "ON" when card 38 is fully installed in slot 16. However, GPSR may have an ON/OFF switch installed on housing 12 if desired.

6. If so programmed by card 38 (or pre-programmed onto microprocessor 34), GPSR 10 initializes itself by running diagnostic routines to verify that it is operating within guidelines. Circuit 30 reads the selected recording interval (and, if applicable, user-selected thresholds for distance and/or parameter value recording) off card 38 and stores the interval into a RAM memory (the memory may be incorporated into microprocessor 34 or constitute a separate component of circuit 30).

7. Data acquisition and recording proceeds generally as indicated in FIGS. 3 and 4. Data recording continues until the stored file on card 38 reaches a predetermined maximum size, until the card is full, until it is removed from slot 16, or until GPSR 10 (or its external power source) is turned off. Circuit 30 may include a logic circuit that alerts the user when card 38 is filled to capacity, so that the user can remove card 38 and insert another card. Alternatively, for units that have more than one memory slot 16, circuit 30 may simply switch to the next card 38 (inserted into a second memory slot) and continue recording. As noted above, the user has the option of stopping data recording when the capacity of card 38 is reached or exceeded, or of overwriting the oldest data point with the new point.

8. When sufficient data has been recorded (for example, upon a driver's completing his assigned route and returning his vehicle to a depot), the user removes card 38 from slot 16. Card 38 is returned to a skilled technician, who proceeds to download, review, and analyze the data recorded thereon.

Upon completion of a recording task, GPSR 10 need not be moved from its location. To proceed to a new job, the user needs only to remove card 38 and insert another card with new operating parameters.

In order to maximize the data-storage capacity of card 38, data is initially stored on the card in binary form; however, other data formats may also be useful. The stored data can readily be converted to ASCII format (or any other formats useful for analyzing the data) using a variety of techniques known in the art. The converted data can then be analyzed. By way of example, the converted data can be imported into spreadsheets, mapping programs, accounting programs, statistical analysis programs, etc. Data gathered via sensors 50 (if present) are integrated with the time/position data collected by GPS receiver 32—this data also can be analyzed in any desired manner.

A GPSR according to the present invention offers the user simplicity of operation and simplicity of conversion of recorded data into useful information. The user of GPSR 10 does not need any specialized training: all that he or she needs to know is how to insert card 38 into slot 16. The actual programming of card 38 and circuit 30, as well as analysis of the data downloaded from card 38, are done by technically-trained personnel. Furthermore, GPSR 10 may be designed for use with a variety of memory devices, including PCMCIA cards and hard drives.

A GPSR apparatus according to the present invention permits the user to customize the data recording process for each individual application simply by programming memory card 38 (or other suitable removable device) in an appropriate fashion. It permits the recorded data to be downloaded and processed at will. Unlike other known GPS apparatus, GPSR 10 is not merely a navigational tool. Rather, it is a management tool which provides after-the fact archival data for use by management, regulatory affairs officers, and others. The type of data produced by GPSR 10 is qualitatively consistent on a day-to-day and an application-to-application basis, providing a user-friendly system that offers a cost-effective solution to control, tracking, verification and compliance questions faced by a variety of industries and agencies.

It will be apparent to those skilled in the art that many changes and substitutions can be made to the preferred embodiment herein described without departing from the spirit and scope of the present invention as defined by the appended claims.

What is claimed is:

1. A method for recording the global position of an object, said method comprising the steps of:

recording operational parameters for a global positioning system recorder on a portable storage device;

installing said storage device in an apparatus operationally connected to said object, said apparatus connected to an antenna capable of receiving GPS satellite signals, said apparatus having GPS circuitry for determining said position by analysis of GPS satellite signals received by said antenna, and programmable control circuitry for reading said operational parameters from said storage device, said control circuitry recording said position on said storage device in accordance with said operational parameters; and providing power to said apparatus so that said control circuitry writes said position on said storage device in accordance with said operational parameters; and said writing step including:
   measuring a value of a parameter of interest;
   checking a previous recorded position of said object;
   checking a previous recorded value of said parameter of interest corresponding to said previous recorded position; and
   writing a new position of said object to said storage device only if said parameter of interest has changed since said previous recorded position was written.

2. The method as recited in claim 1, further comprising the steps of:
   receiving input data from at least one sensor connected to said apparatus;
   determining a position of said object according to said operational parameters; and
   writing said position and a value of said input data corresponding to said position on said storage device.

3. The method as recited in claim 1, further comprising the steps of:
   receiving input data from at least one sensor connected to said apparatus;
   according to said operational parameters, determining a time corresponding to said input data; and
   writing said time and a value of said input data corresponding to said time on said storage device.

4. The method as recited in claim 1, wherein said writing step further comprises the steps of:
   checking a previous recorded position of said object;
   writing a new position of said object to said storage device only if said apparatus has moved since said previous recorded position was written.

5. The method as recited in claim 1, wherein said writing step further comprises the steps of:
   checking a previous recorded position of said object;
   writing a new position of said object to said storage device only if said apparatus has moved by at least a preselected distance since said previous recorded position was written.

6. The method as recited in claim 1, wherein said writing step further comprises the step of:
   if said parameter of interest has changed since said previous recorded value was written, writing said value and a new position of said object corresponding to said value to said storage device.

7. The method as recited in claim 1, wherein said writing step further comprises the step of:
   writing a new position of said object to said storage device only if said value has changed by at least a preselected amount since said previous recorded position was written to said storage device.

8. The method as recited in claim 1, wherein said writing step further comprises the step of:
   if said parameter of interest has changed by at least a preselected amount since said previous recorded value was written, writing said value and a new position of said object corresponding to said value to said storage device.

9. The method as recited in claim 1, wherein said recording step includes the step of selecting a recording interval.

10. The method as recited in claim 1, further comprising the steps of:
    removing said storage device from said apparatus; and
    downloading data stored on said storage device.

11. The method as recited in claim 1, further comprising the steps of:
    removing said storage device from said apparatus;
    downloading data stored on said storage device to a computer; and
    analyzing said data.

12. An apparatus for recording the global position of an object, said apparatus comprising:
    a housing;
    GPS circuitry inside said housing, said GPS circuitry capable of receiving GPS satellite signals when connected to an antenna, said GPS circuitry analyzing said signals to determine a global position of said apparatus;
    means in said housing for receiving at least one portable memory storage device; and
    programmable control circuitry inside said housing, said control circuitry being electrically connected to said GPS circuitry and said receiving means, said control circuitry including:
    means for reading operational parameters from a storage device installed in said receiving means,
    means for writing positional data to said storage device, said writing means responsive to said operational parameters;
    means for measuring a value of a parameter of interest;
    means for checking a previous recorded position of said object;
    means for checking a previous recorded value of said parameter of interest corresponding to said previous recorded position; and
    means for writing a new position of said object to said storage device only if said parameter of interest has changed since said previous recorded position was written to said storage device.

13. The apparatus as recited in claim 12, further comprising means for filtering out undesired GPS data.

14. The apparatus as recited in claim 12, further comprising:
    means for receiving data from at least one sensor; and
    means for integrating said positional data with said sensor data,
    wherein said writing means includes means for writing said sensor data to said storage device according to said operational parameters.

15. The apparatus as recited in claim 12, further comprising:
    means for receiving data from at least one external sensor; and
    means for correlating said positional data with said sensor data,
    wherein said writing means includes means for writing said sensor data to said storage device according to said operational parameters.

16. The apparatus as recited in claim 12, wherein said control circuitry further comprises means for comparing a positional data point with a previous recorded positional data point, said control circuitry recording said positional data point on said storage device only if said positional data point differs from said previous positional data point.

17. The apparatus as recited in claim 12, wherein said operational parameters include a user-programmable minimum distance, and wherein said control circuitry further comprises means for comparing a positional data point with a previous recorded positional data point, said control circuitry recording said positional data point on said storage device only if said positional data point differs from said previous positional data point by at least said minimum distance.

18. The apparatus as recited in claim 12, wherein said writing means includes means for writing data from at least one sensor to said storage device, and wherein said apparatus further comprises:

means for receiving data from said at least one sensor;

means for correlating said positional data with said sensor data; and means for comparing a sensor data point with a previous recorded sensor data point, said control circuitry recording said sensor data point on said storage device only if said sensor data point differs from said previous sensor data point.

19. The apparatus as recited in claim 12, wherein said operational parameters include a user-programmable minimum amount, wherein said writing means includes means for writing data from at least one sensor to said storage device, and wherein said apparatus further comprises:

means for receiving data from said at least one sensor;

means for correlating said positional data with said sensor data; and means for comparing a sensor data point with a previous recorded sensor data point, said control circuitry recording said sensor data point on said storage device only if said sensor data point differs from said previous sensor data point by at least said minimum amount.

* * * * *